(12) United States Patent
Wouhaybi et al.

(10) Patent No.: US 12,459,117 B2
(45) Date of Patent: Nov. 4, 2025

(54) DIVERSIFIED IMITATION LEARNING FOR AUTOMATED MACHINES

(71) Applicant: Intel Corporation, Santa Clara, CA (US)

(72) Inventors: Rita H. Wouhaybi, Portland, OR (US); Atul N. Hatalkar, Chandler, AZ (US); Hassnaa Moustafa, Portland, OR (US); Siew Wen Chin, Penang (MY); Sangeeta Manepalli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 17/304,800

(22) Filed: Jun. 25, 2021

(65) Prior Publication Data

US 2021/0319367 A1    Oct. 14, 2021

(51) Int. Cl.
*B25J 9/16* (2006.01)
*G06N 20/00* (2019.01)

(52) U.S. Cl.
CPC .............. *B25J 9/1656* (2013.01); *B25J 9/163* (2013.01); *G06N 20/00* (2019.01); *G05B 2219/40116* (2013.01); *G05B 2219/40391* (2013.01)

(58) Field of Classification Search
CPC ......... B25J 9/1656; B25J 9/163; G06N 20/00; G06Q 10/06395; G06Q 50/04; G06F 16/906; G05B 2219/40116; G05B 2219/40391

See application file for complete search history.

(56) References Cited

U.S. PATENT DOCUMENTS

| | | | |
|---|---|---|---|
| 2018/0354127 A1* | 12/2018 | Ando | G06Q 10/0633 |
| 2020/0134505 A1* | 4/2020 | Jang | B25J 9/163 |
| 2020/0223065 A1* | 7/2020 | Hane | B25J 9/1674 |

(Continued)

OTHER PUBLICATIONS

Abbeel, P., "Apprenticeship learning via inverse reinforcement learning", Proceedings of the International Conferenceon Machine Learning (ICML), (2004), 8 pgs.

(Continued)

*Primary Examiner* — Abby Lin
*Assistant Examiner* — Karston G. Evans
(74) *Attorney, Agent, or Firm* — Schwegman Lundberg & Woessner, P.A.

(57) ABSTRACT

Disclosed herein are embodiments of systems and methods for diversified imitation learning for automated machines. In an embodiment, a process-profiling system obtains sensor data captured by a plurality of sensors that are arranged to observe one or more human subjects performing one or more processes to accomplish one or more tasks. The process-profiling system clusters the sensor data based on a set of one or more process-performance criteria. The process-profiling system also performs, based on the clustered sensor data, one or both of generating and updating one or more process profiles in a plurality of process profiles. The process-profiling system selects, for one or more corresponding automated machines, one or more process profiles from among the plurality of process profiles, and the process-profiling system configures the one or more corresponding automated machines to operate according to the selected one or more process profiles.

24 Claims, 7 Drawing Sheets

(56) References Cited

U.S. PATENT DOCUMENTS

| | | | |
|---|---|---|---|
| 2021/0229281 A1* | 7/2021 | Natarajan | B25J 9/1669 |
| 2021/0362327 A1* | 11/2021 | Kolluri | B25J 9/1689 |
| 2021/0362328 A1* | 11/2021 | Kolluri | B25J 13/06 |
| 2021/0387330 A1* | 12/2021 | Mavrin | B25J 9/163 |
| 2023/0311309 A1* | 10/2023 | Jaekel | B25J 9/161 |
| | | | 700/254 |

OTHER PUBLICATIONS

Duan, Y., "One-shot imitation learning", NIPS, (2017), 12 pgs.

Ng, A.Y., "Algorithms for inverse reinforcement learning", Proceedings of the Seventeenth International Conferenceon Machine Learning (ICML), (2000), 8 pgs.

Tremblay, Jonathan, "Synthetically Trained Neural Networks for Learning Human-Readable Plans from Real-World Demonstrations", (2018), 9 pgs.

\* cited by examiner

DIVERSIFIED IMITATION LEARNING FOR AUTOMATED MACHINES

TECHNICAL FIELD

Embodiments of the present disclosure relate to automation and machine learning, and, more particularly, to systems and methods for diversified imitation learning for automated machines.

BACKGROUND

In today's modern world, the presence of computing devices (including communication devices) is already nearly ubiquitous, and increasing all the time. In many sectors of the economy, such as manufacturing for example, a type of electromechanical computing device known as a robot (or automated machine) is being used—or multiple robots are being used—to perform various processes to accomplish various tasks. The use of robots in manufacturing is often the result of one or more factors such as increasing availability and decreasing cost of computing devices, competitive pressures, labor shortages, and/or the like.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 1 illustrates an example communication context, within which at least one embodiment can be deployed, performed, and/or the like.

DETAILED DESCRIPTION

In many cases, a large number (e.g., ~500 or ~1,000, as examples) of robots are deployed in a given manufacturing facility. In some cases, a given robot may manufacture an entire product. In other cases, a series of robots may be arranged in assembly-line-like fashion, with each robot performing a specific process (e.g., a sub-process of an overall manufacturing process) to accomplish a specific task (e.g., a sub-task where the overall task may be to manufacture the given product). Such sub-processes could include examples such as arranging and fastening multiple parts together, applying an anti-rust coating to a part or an assembly of parts, painting a part or an assembly of parts, and so forth. Furthermore, it is explicitly noted that manufacturing is used in the present disclosure as an example context. Embodiments of the present disclosure can be employed in connection with various other contexts instead of or in addition to manufacturing. Some other example contexts include package delivery, construction, cleaning, waste removal, sorting recyclables, retail, hospitals, other healthcare, food preparation and/or packaging, shipping, sorting, warehouse functions, and so on.

Disclosed herein are embodiments of systems and methods for diversified imitation learning for automated machines. One embodiment takes the form of a process-profiling system that obtains sensor data captured by a plurality of sensors that are arranged to observe one or more human subjects performing one or more processes to accomplish one or more tasks. The process-profiling system clusters the sensor data based on a set of one or more process-performance criteria. The process-profiling system performs, based on the clustered sensor data, one or both of generating and updating one or more process profiles in a plurality of process profiles. The process-profiling system selects, for one or more corresponding automated machines, one or more process profiles from among the plurality of process profiles. The process-profiling system configures the one or more corresponding automated machines to operate according to the selected one or more process profiles.

As described herein, one or more embodiments of the present disclosure take the form of methods that include multiple operations. One or more other embodiments take the form of systems that include at least one hardware processor and that also include one or more non-transitory computer-readable storage media containing instructions that, when executed by the at least one hardware processor, cause the at least one hardware processor to perform multiple operations (that in some embodiments do and in other embodiments do not correspond to operations performed in a herein-disclosed method embodiment). Still one or more other embodiments take the form of one or more non-transitory computer-readable storage media (CRM) containing instructions that, when executed by at least one hardware processor, cause the at least one hardware processor to perform multiple operations (that, similarly, in some embodiments do and in other embodiments do not correspond to operations performed in a herein-disclosed method embodiment and/or operations performed by a herein-disclosed system embodiment).

Furthermore, a number of variations and permutations of embodiments are described herein, and it is expressly noted that any variation or permutation that is described in this disclosure can be implemented with respect to any type of embodiment. For example, a variation or permutation that is primarily described in this disclosure in connection with a method embodiment could just as well or instead be implemented in connection with a system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

Figure 1:
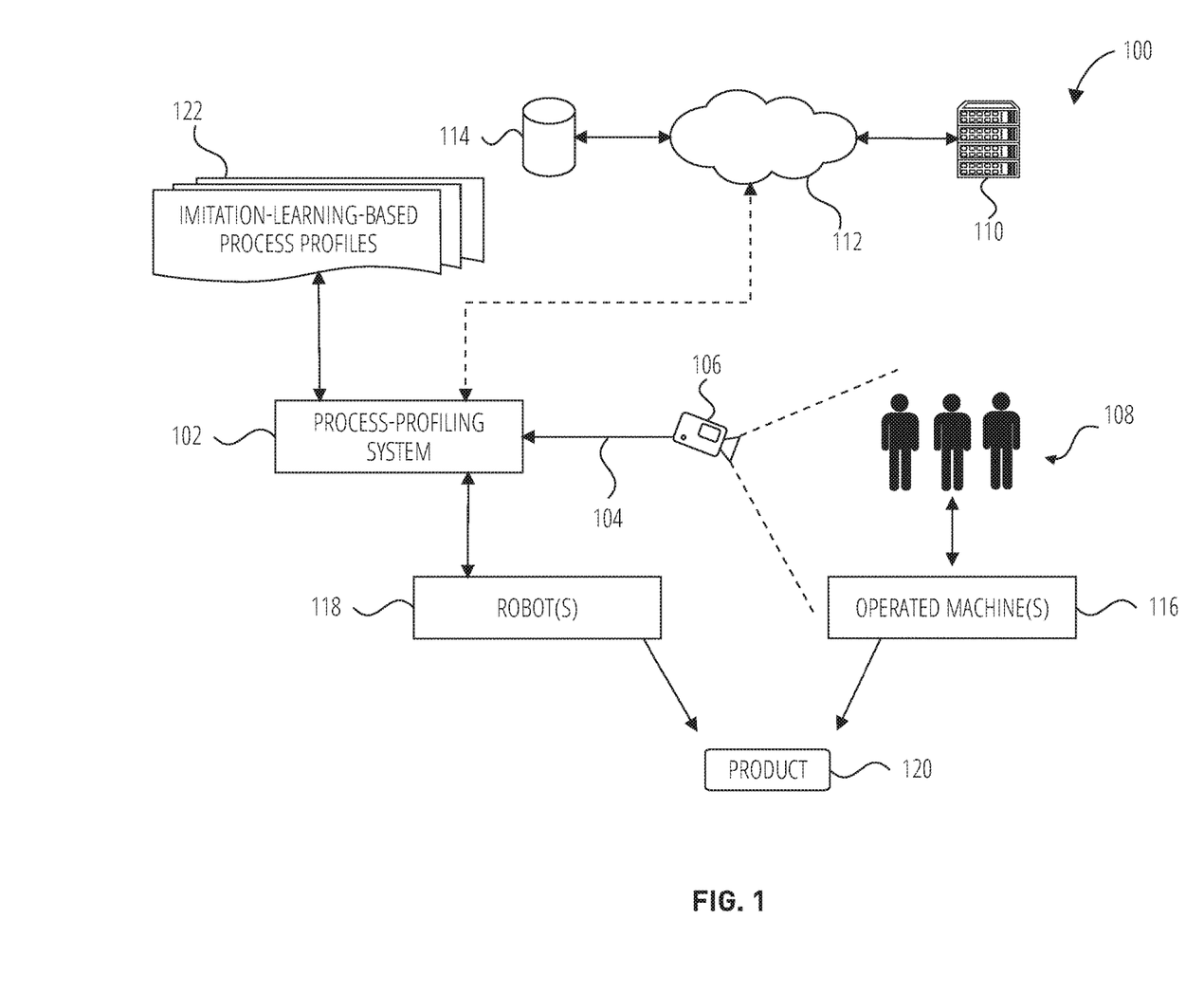

FIG. 1 illustrates an example communication context 100 that includes an example process-profiling system 102, in accordance with at least one embodiment. The communication context 100 is provided by way of example and not limitation, as a communication context in connection with a given implementation could have different numbers, types, and/or arrangements of devices, systems, and/or the like. Moreover, while the communication context 100 is described here as pertaining to manufacturing environments, the present disclosure is not limited in applicability to such environments, as embodiments of the present disclosure could be applied to many different types of situations, contexts, environments, and/or the like.

The communication context 100 includes a process-profiling system 102 that receives sensor data 104 from one or more sensors 106 (represented by way of example with a video-camera icon). The sensors 106 could capture images, video, audio, temperature, motion (of, e.g., one or more wearable devices), and/or any other type of sensor data deemed suitable for a given embodiment. The sensors 106 are depicted as observing people 108—which are also referred to herein at times as human subjects, human operators, human workers, and the like-operating one or more operated machines 116 to generate or handle an example product 120.

Any one or more of the sensors 106 could be associated with (e.g., observing) a single person 108, and any one or more of the sensors 106 could be associated with (e.g., observing) more than one of the people 108. Moreover, different implementations can have different combinations of sensors 106, depending on the particulars of each use case. Additionally, the depiction of the sensors 106 using a single camera icon in FIG. 1 is not to imply that the sensor data 104 is received by the process-profiling system from a single source (e.g., a single node having one or more sensors). In any implementation, the sensor data 104 can be received by the process-profiling system 102 from any number of nodes, systems of nodes, and/or the like.

The communication context 100 also includes one or more robots 118 that are also configured to generate or interact with the product 120. In some embodiments, one or more robots may perform a service rather than generate or interact with a product. Some robots may do both and/or perform one or more other functions. Although they are depicted separately in FIG. 1, it may be the case in many embodiments that the very same machines can be operated by either one or more human operators or by automated control. The process-profiling system 102 communicates with the robots 118 and also maintains one or more imitation-learning-based process profiles 122. The process-profiling system 102 may be network-connected, and is depicted by way of example as being connected to a network 112 that in turn is connected to an example computing device 110 and an example database 114. Several of the entities that are represented in FIG. 1 are further discussed below.

In general, imitation learning is an important technique in contexts in which plans are being made and/or executed to have one or more automated machines (e.g., robots) work instead of or alongside human workers. As a technique, imitation learning collects large amounts of data for a task completion using multiple sensors including video. The sensor data 104 may then be used to divide a process (for accomplishing a task) into a series of sub-processes that a robot can be trained to mimic. This technique is powerful since, in many cases, a person need not explicitly define those tasks, processes, sub-processes, and the like, allowing for automation of the learning and for scale across multiple real-life contexts.

One drawback of imitation learning in current implementations is that it does not differentiate who is it learning from and cannot understand different styles of different human workers and how those different styles could impact the final outcome. For example, in the context of an industrial process such as welding, a first human worker may be highly focused on the quality of their outcome, and may accordingly take their time to make sure that each operation and welding application is the best they can achieve given the material and/or other factors. A second human worker may, however, not be as concerned about achieving the highest-possible quality and instead prefers to operate on the margins with "good enough" output. This second human worker may be able to perform more operations (e.g., produce more products) than the first human worker over a given time period. In other words, the first human worker prioritizes quality while the second human worker prioritizes yield.

In current implementations that utilize imitation learning to train robots, the gathered data is normalized across all observed workers, and a single profile is generated that reflects, e.g., the elements common to all or most of the observations. As such, a current implementation may arrive at a process profile that does not prioritize quality over yield, yield over quality, or anything else. The resulting process profile is thus not really reflective of reality, but instead has lost any nuances that might be present among different types of workers. With just a single process profile, no tradeoffs are even available to, e.g., factory operators.

In various different embodiments of the present disclosure, human operators are observed and grouped (clustered) based on several parameters. These groups are used to create different ones of the imitation-learning-based process profiles 122. These profiles can then be swapped in and out of operation (e.g., a first profile could be used for a first time period and then a second profile could be used for a second time period, and so forth) based on a desired overall outcome. For example, a factory may be configured to operate in a high-quality (and increased-time) mode for certain parts or days and then be switched to a high-yield (with acceptable quality) mode on other days or parts of the operation. And certainly numerous other examples could be given.

Different modes of operating machines are differentiated in embodiments of the present disclosure. Such differences are used in at least one embodiment to generate multiple different process profiles that respectively represent multiple different ways of performing a certain process, part of a certain process (e.g., a sub-process), and the like. The resulting diversification among various different ones of the imitation-learning-based process profiles 122 for use in, e.g., a factory allows for greater flexibility in the outcome and throughput of the factory.

In at least one embodiment, a set of metadata is compiled associated with each of a plurality of human operators, and this metadata may include outcome data, which characterizes the overall outcome of the operations performed by that human operator. In some embodiments, the operations of each of a plurality of human operators are subdivided in association with two or more sub-processes that have been defined with respect to a "parent" process. The collected metadata is used in at least one embodiment to group the observed human operators according to similar characteristics (e.g., outcomes), and those groupings are in turn used to generate process profiles that are specific to each grouping. Thus, metadata that is associated with a set of workers that are very careful and not as quick may be grouped together and used to generate a "careful, high-quality work" process profile. Similarly, metadata that is associated with a different set of workers that are perhaps less careful but produce at a higher rate may be grouped together and used to generate a "rapid, sufficient quality" process profile. And so forth.

A factory operator may then be able to choose which of those two profiles to implement at various different times for various different reasons. Moreover, the factory operator may be able to assemble one or more hybrid profiles by using (i) one or more sub-profiles from the "careful, high-quality work" process profile to use for one or more particular sub-processes and (ii) one or more sub-profiles from the "rapid, sufficient quality" process profile to use for one or more other sub-processes. And certainly this concept is extendable to any number of process profiles, each of which could have any suitable number of sub-profiles for sub-processes, and so forth. With embodiments of the present disclosure, the example factory operator is able to figuratively turn different knobs (e.g., quality vs. yield) in different ways to make different tradeoffs as deemed appropriate for various different situations.

Human operators may, in accordance with various different embodiments, be clustered based on factors such as time per product, number of products produced over a given time, one or more quality scores, and/or the like. Moreover, data can be gathered at any desired level of complexity (e.g., tracking type of material, time elapsed on each of multiple sub-processes, amount of wasted material, and/or the like) and at any desired level of granularity. As to granularity, this applies to how finely a given process is logically sub-divided into component sub-processes, to how many quality-control levels or scores are possible, to what units amounts (e.g., weights) of wasted material are rounded, and so forth.

As a general matter, any of the devices, systems, and the like that are depicted in FIG. 1 and/or in any of the other figures could have an architecture similar to that described below in connection with the example computer system 600 of FIG. 6 and could contain and execute software having an architecture similar to that described below in connection with the example software architecture 702 of FIG. 7. Moreover, any of the communication links depicted in FIG. 1 and/or in any of the other figures could be or include one or more wired-communication links (e.g., Ethernet, fiber optic, Universal Serial Bus (USB), and/or the like) and/or one or more wireless-communication links (e.g., Wi-Fi, LTE, NFC, Bluetooth, Bluetooth Low Energy, and/or the like). Any one or more of the communication links could include one or more intermediate devices such as one or more routers, bridges, servers, access points, base stations, and/or the like. Additionally, any communication link could include one or more VPNs and/or other tunneling-type connections.

Figure 2:
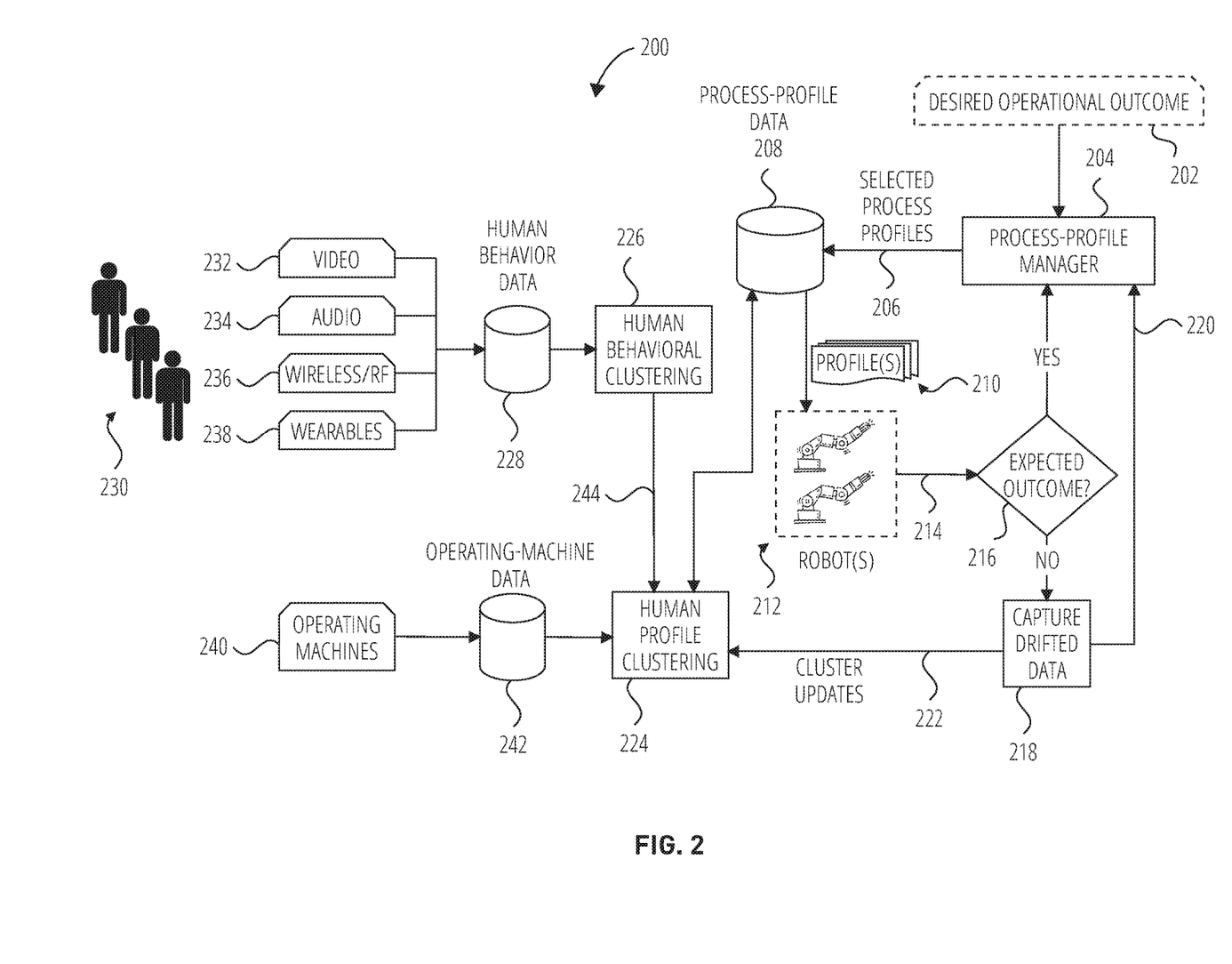
FIG. 2 illustrates an example information-flow diagram, in accordance with at least one embodiment.

FIG. 2 depicts an example information-flow diagram 200, in accordance with at least one embodiment. The information-flow diagram 200 includes a desired operational outcome 202 being received by a process-profile manager 204, which transmits selected process profile 206, to a process-profile database 208. From the process-profile database 208, robot-specific process profiles 210 are transmitted to one or more robots 212. At the decision box 216, it is determined whether an expected outcome was achieved. If so, control returns to the process-profile manager 204. If not, control passes to a drifted-data-capture function 218. From there, a cluster update 222 is transmitted from the drifted-data-capture function 218 to a human-profile-clustering function 224. The drifted-data-capture function 218 also passes drifted-data-based profile selection/adjustment 220 data to the process-profile manager 204.

The human-profile-clustering function 224 also takes input from a human-behavioral-clustering function 226 and operating-machine data 242, which is captured from one or more operating machines 240. The human-behavioral-clustering function 226 outputs a human-behavioral-clustering output 244 to the human-profile-clustering function 224, and takes as its input collected human-behavior data 228 as gathered from sensors such as an image-capture system 232, an audio-capture system 234, an RF transmitter 236, a wearable device 238, and/or the like. Those sensors 106 may be observing one or more of the people 302 when performing the associated processes.

In various different embodiments, one or more of the following aspects are provided:

Training: when observing manual operators to create/train imitation-learning models, a set of metadata may be captured that includes time to complete, errors generated by the process, quality control output (if available), similarity to other workers models, and/or the like.

Clustering: in at least one embodiment, these models are analyzed to identify how similar they are. For example, similarity could be measured by how much the weights change when the data from a different worker is used. Other measures of similarity are possible. Based on this similarity, the models are clustered.

Deployment: during an execution phase, a factory operator (or an automated system) may decide on a set of desired operational outcomes. A profile-manager agent may select robot-profiles to meet the overall operational demand. It is possible that different robots, all performing the same overall task, may be given different profiles to achieve an overall goal of the production output.

Tuning: as the models are used over time, additional metadata may be captured such as quality, speed, and/or other operational parameters. This metadata can then be used to further tune/optimize the profiles data.

Retraining: If performance of robots, when using the set of previously learned profiles, consistently misses the target operational parameters, then then the Training phase may be re-invoked to relearn the profiles. The retraining may be used to update all learned profiles, or a partial relearn may be used.

A human profile may be constituted by learning from the human behavior as well as learning from a machine used by the human (or anything in the environment that can track the outcome/resulted work for the human behavior). Taking a factory as an example, the operating machine(s) can provide information on the task completion time, any resulted error, and the quality of the work, etc. that in turn can reflect the performance of the human operator.

A process-profile database 208 may be used as the model server that any robot can use based on the profile match.

A feedback loop may be provided to the process-profile database 208 to reflect how effective, accurate, and/or the like a training model was during one or more runs, which in turn can be used to update one or more models/profiles.

Natural Language Processing (NLP): to learn more about the task from any word expressions the human worker can say. For example, if the human worker says something that shows non-satisfaction, this can indicate that the task is not straight-forward or the current working style is not matching the task requirements.

Figure 3:
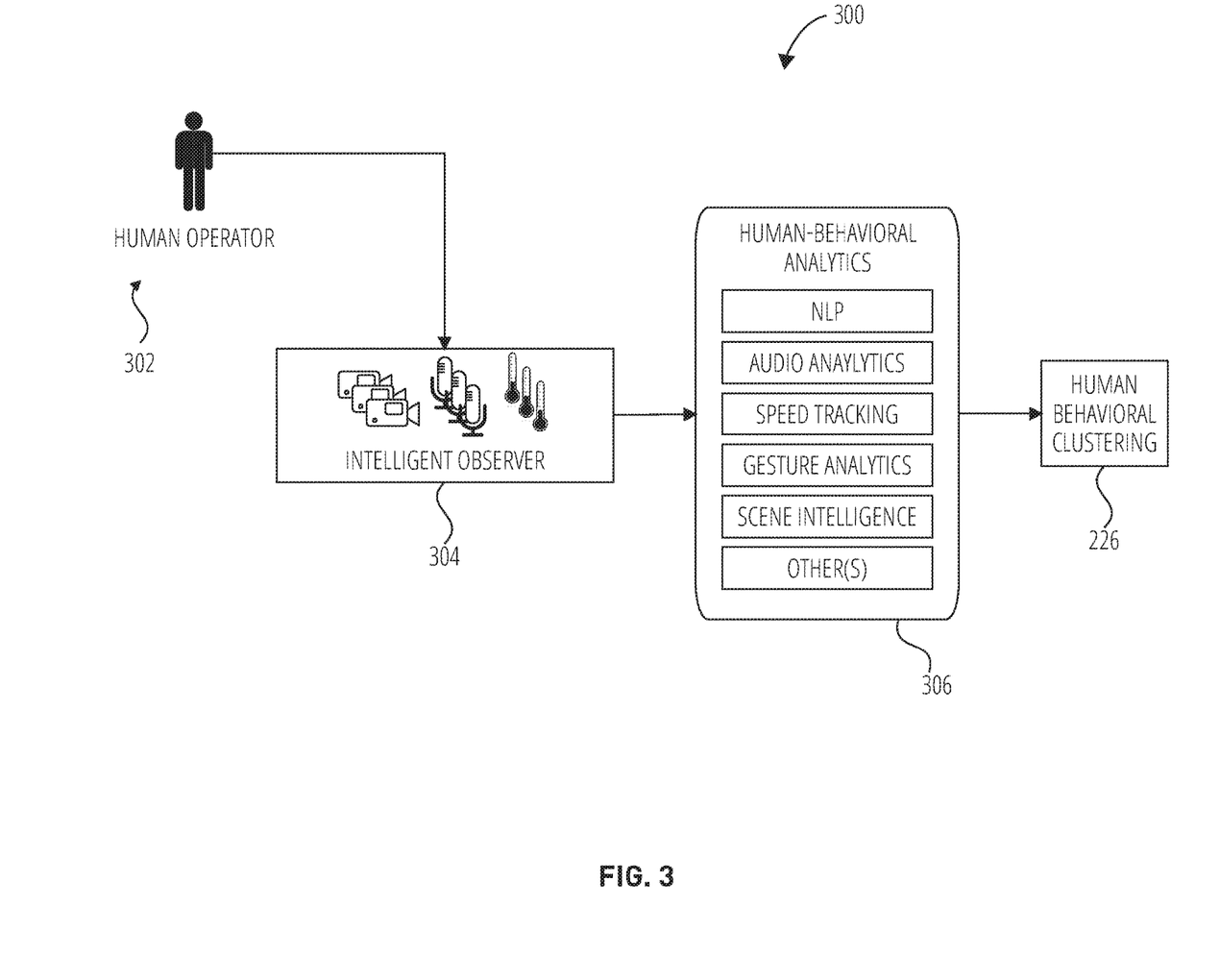
FIG. 3 illustrates an example human-behavioral-profiling diagram, in accordance with at least one embodiment.

FIG. 3 depicts an example human-behavioral-profiling diagram 300, in accordance with at least one embodiment. As discussed below, the human-behavioral-profiling diagram 300 includes a human-behavioral-clustering function 226, a person 302, an intelligent-observer system 304, and human-behavioral analytics 306. FIG. 3 provides examples of human behavior profiling and clustering considering not only working/operation actions by human workers but also, in at least one embodiment, human expressions towards the task being accomplished, expressions in general that can convey fatigue for example.

In at least one embodiment, to facilitate human behavioral profiling, intelligent analytics are generated via the intelligent-observer system 304, observing the human operator/worker to be able to learn on the task through the human operator reactions during working and add this to a human behavioral profile. For this, in at least one embodiment, an edge platform can be utilized with diverse sensing capabilities (cameras, audio/acoustic sensors, temperature, etc.) to operate a logical observer. The logical observer can perform one or more of the following example functions:

Expression Analytics: to learn whether a human worker is having pain or showing any difficulty. For example, if the human worker shows face signs of hardness or surprise, this can indicate that the task could benefit from more care.

Audio Analytics: to learn about any incident that can happen to a human worker during a work task. For example, if the human worker emits tones of pain, this can reflect the level of danger of a task.

Temperature Detection: to learn about the impact of the environment on the human worker health. For example, if the human worker temperature changes during the continuous work in the location where the task is accomplished, this can indicate that this type of task generates heat over time and can impact not only the human operator but automated machines (e.g., robots) that learn by imitation (and specific cooling mechanisms may be beneficial, for example).

Scene Filtering: To filter one or more, and perhaps in some cases all, parts of the scene that do not help the imitation training and can cause distraction to the automated machines. For example, if a human worker yawns or does arm stretching to relax, for example, this can be learned as out of context and can be filtered from the scene.

In at least one embodiment, consideration is given to privacy of the human workers. The intelligent-observer system 304 may incorporate privacy measures through, for example, blurring a face of a human worker and/or a name tag (e.g., if this is desired or required by a human worker). In some embodiments, at least some measure of control is provided to a human worker that is being used as a learning sample. For example, a human worker can do "hand waves" or another gesture to stop the scene consideration at any moment, such as to preserve privacy at any situation that can be undesirable to share. In at least one embodiment, the intelligent-observer system 304 learns to recognize gestures, to be able to comply with one or more requested actions by a human worker. Multi-modal processing capabilities across the above capabilities can be used in different combinations to generate all possible type of profiles that can help wide-scale imitation learning.

Imitation learning can be also associated with supervised learning and reinforcement learning as follows. Supervised imitation learning can be used for a standard (e.g., rarely changing) work environment. If automated machines are deployed in an environment with low variation possibility in the environment and/or the tasks, then the profiling that matches exactly (or best matches) the environment as well as the task type may be chosen for imitation learning. Reinforcement imitation learning can be utilized for unpredictable environments and less standard tasks. If one or more automated machines are to be deployed in an environment susceptible to variation (e.g., outdoor environment for mining, gas industry, factory, etc.) and for tasks that vary often, a closest profile may be chosen. Based on outcomes, other profiles may iteratively be selected.

Figure 4:
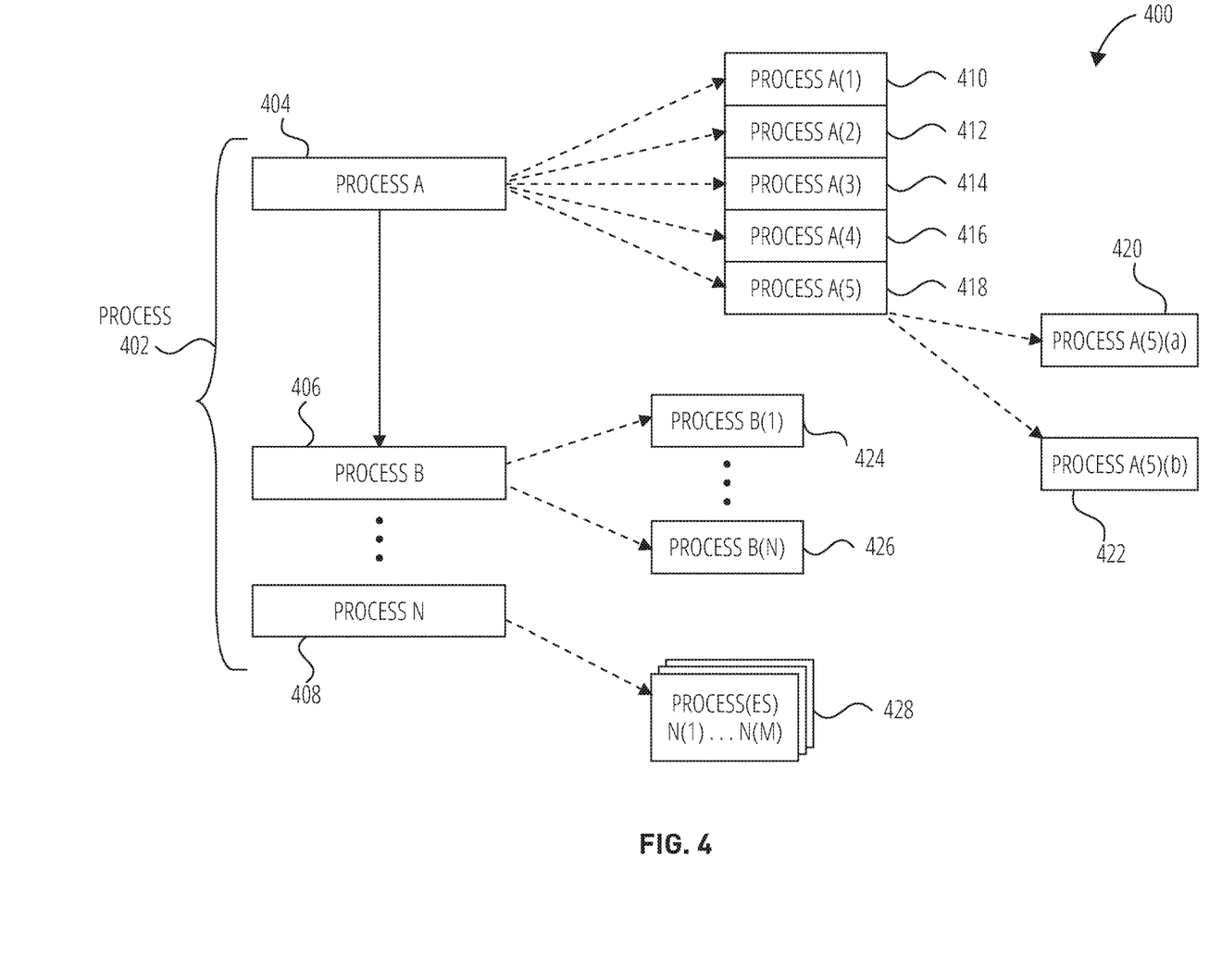
FIG. 4 illustrates an example process map, in accordance with at least one embodiment.

FIG. 4 depicts an example process map, generally showing that a given overall process 402 could include a process A 404, a process B 406, through a process N 408 (i.e., any number of processes). It is noted that, in this disclosure a process is referred to as a "process" even if that process is a sub-process of another process. In the depicted example, the process A 404 includes a process A(1) 410, a process A(2) 412, a process A(3) 414, a process A(4) 416, and a process A(5) 418, the latter of which includes a process A(5)(a) 420 and a process A(5)(b) 422. Moreover, the process B 406 includes a process B(1) 424, through a process B(N) 426 (i.e., any number of processes), and the process N 408 includes any number of one or more processes referred to as process N(1) . . . N(M) 428.

Figure 5:
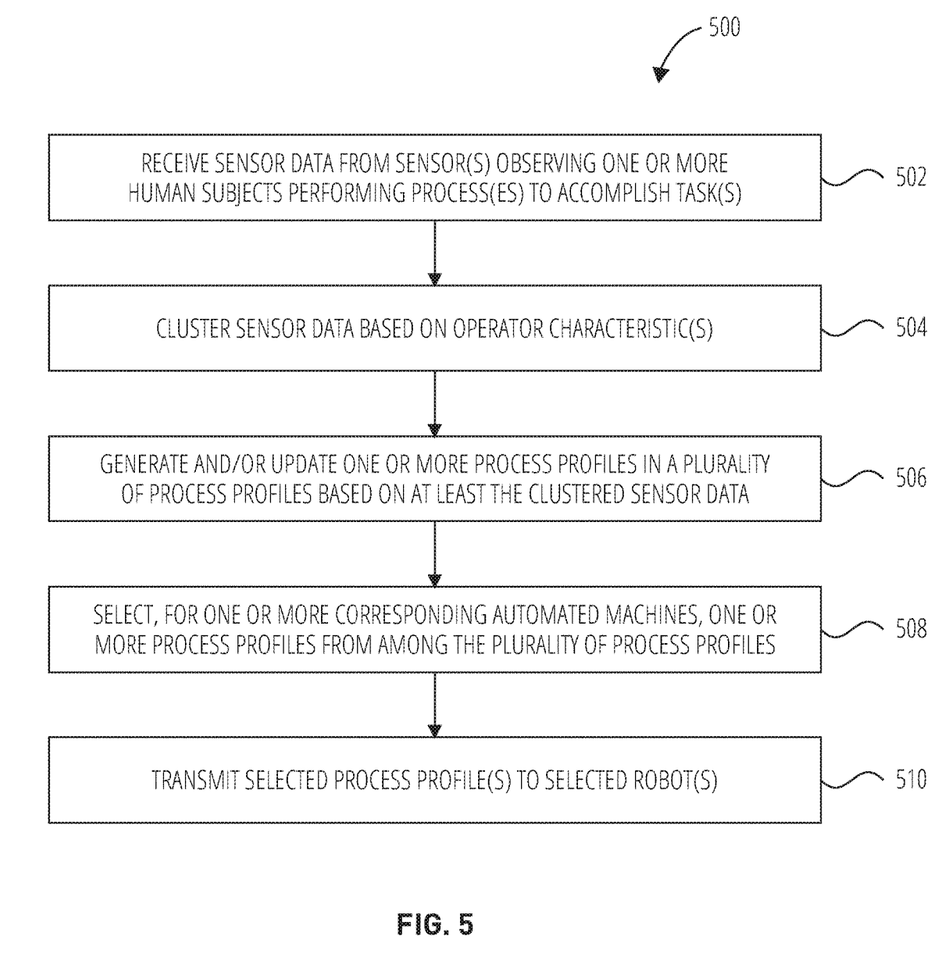
FIG. 5 illustrates an example method, in accordance with at least one embodiment.

FIG. 5 depicts a method 500 that may be performed by a computing system such as the process-profiling system 102 or the process-profile manager 204 as examples. In general, the method 500 can be performed by any one or any combination of computing devices that are suitably programmed to perform the operations described herein. By way of example, the method 500 is described below as being performed by the process-profiling system 102.

At operation 502, the process-profiling system 102 obtains sensor data captured by a plurality of sensors that are arranged to observe one or more human subjects performing one or more processes to accomplish one or more tasks. The plurality of sensors may include one or more of a video sensor, an audio sensor, a wireless-communication sensor, and a sensor associated with a wearable device (e.g., a wearable device that is being worn by one of the at least one human subjects). At least one of the one or more processes may include a sub-process.

At operation 504, the process-profiling system 102 clusters the sensor data based on a set of one or more process-performance criteria. Clustering the sensor data based on the set of one or more process-performance criteria may include clustering human-subject-based sets of sensor data, each human-subject-based set of sensor data corresponding to a human subject of the one or more human subjects. Clustering the human-subject-based sets of sensor data may include performing multiple different clusterings of the human-subject-based sets of sensor data, each of the multiple different clusterings using different sets of the process-performance criteria. The process-performance criteria may include at least one quality metric associated with performance of at least one of the one or more processes. The process-performance criteria may include at least one time-based metric associated with performance of at least one of the one or more processes.

In at least one embodiment, one or more quality metrics and/or one or more time-based metrics may be selected for a given implementation based at least in part on a type of application, use case, etc. represented by that implementation. One example of this is that different implementations could be associated with different specifications (e.g., requirements) as to image quality, and/or more generally with respect to a level of resolution for any given metric.

At operation 506, the process-profiling system 102 performs, based on at least the clustered sensor data, one or both of generating and updating one or more process profiles in a plurality of process profiles.

At operation 508, the process-profiling system 102 selects, for one or more corresponding automated machines, one or more process profiles from among the plurality of process profiles. This may include selecting a first process profile for a first one of the automated machines and selecting a second, different process profile for a second one of the automated machines.

At operation 510, the process-profiling system 102 configures the one or more corresponding automated machines to operate according to the selected one or more process profiles. This may include transmitting instructions to the corresponding automated machines.

Figure 6:
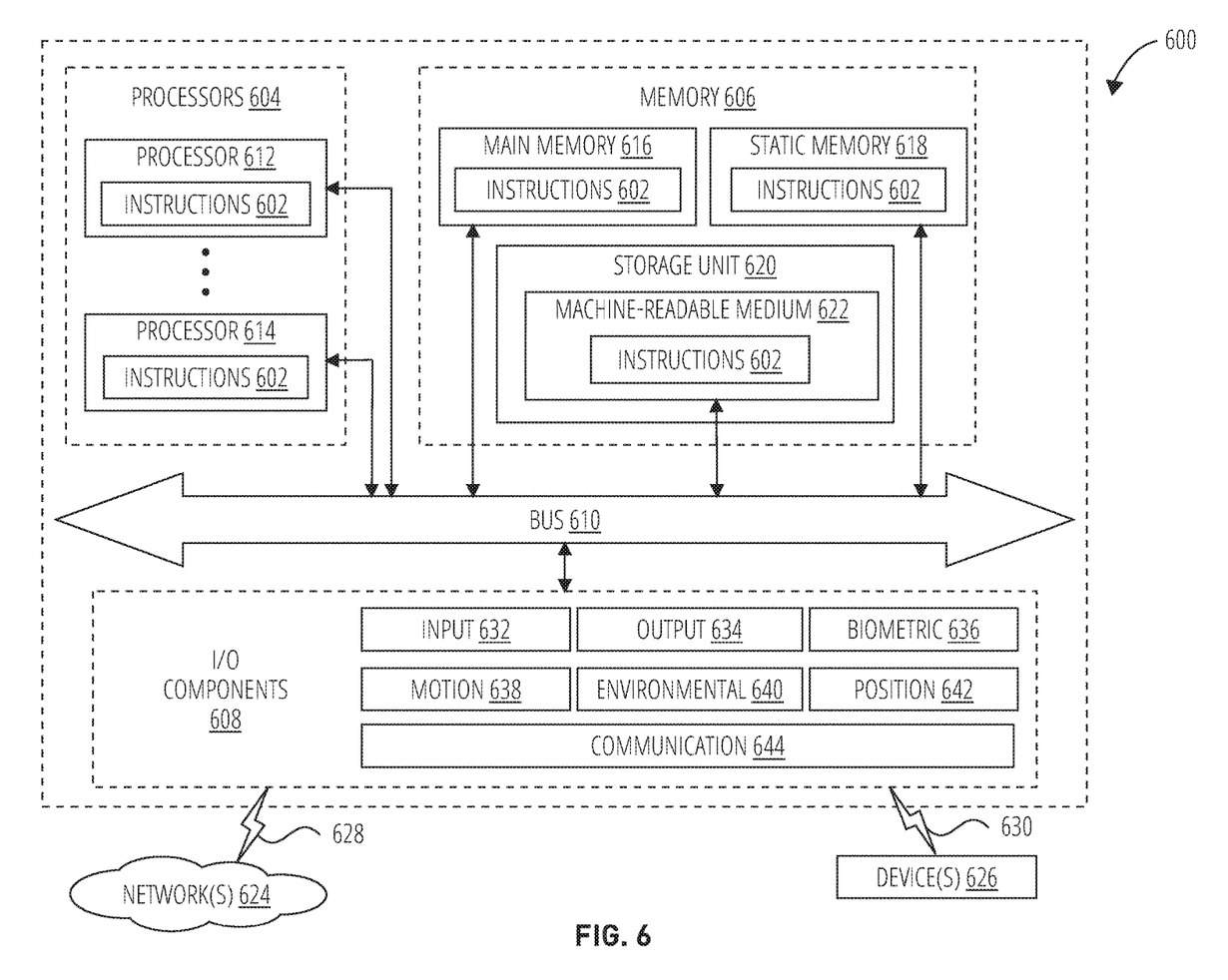
FIG. 6 depicts an example computer system, in accordance with at least one embodiment.

FIG. 6 illustrates an example computer system 600 within which instructions 602 (e.g., software, firmware, a program, an application, an applet, an app, a script, a macro, and/or other executable code) for causing the computer system 600 to perform any one or more of the methodologies discussed herein may be executed. In at least one embodiment, execution of the instructions 602 causes the computer system 600 to perform one or more of the methods described herein. In at least one embodiment, the instructions 602 transform a general, non-programmed computer system into a particular computer system 600 programmed to carry out the described and illustrated functions. The computer system 600 may operate as a standalone device or may be coupled (e.g., networked) to and/or with one or more other devices, machines, systems, and/or the like. In a networked deployment, the computer system 600 may operate in the capacity of a server and/or a client in one or more server-client relationships, and/or as one or more peers in a peer-to-peer (or distributed) network environment.

The computer system 600 may be or include, but is not limited to, one or more of each of the following: a server computer or device, a client computer or device, a personal computer (PC), a tablet, a laptop, a netbook, a set-top box (STB), a personal digital assistant (PDA), an entertainment media system, a cellular telephone, a smartphone, a mobile device, a wearable (e.g., a smartwatch), a smart-home device (e.g., a smart appliance), another smart device (e.g., an Internet of Things (IoT) device), a web appliance, a network router, a network switch, a network bridge, and/or any other machine capable of executing the instructions 602, sequentially or otherwise, that specify actions to be taken by the computer system 600. And while only a single computer system 600 is illustrated, there could just as well be a collection of computer systems that individually or jointly execute the instructions 602 to perform any one or more of the methodologies discussed herein.

As depicted in FIG. 6, the computer system 600 may include processors 604, memory 606, and I/O components 608, which may be configured to communicate with each other via a bus 610. In an example embodiment, the processors 604 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, as examples, a processor 612 and a processor 614 that execute the instructions 602. The term "processor" is intended to include multi-core processors that may include two or more independent processors (sometimes referred to as "cores") that may execute instructions contemporaneously. Although FIG. 6 shows multiple processors 604, the computer system 600 may include a single processor with a single core, a single processor with multiple cores (e.g., a multi-core processor), multiple processors with a single core, multiple processors with multiples cores, or any combination thereof.

The memory 606, as depicted in FIG. 6, includes a main memory 616, a static memory 618, and a storage unit 620, each of which is accessible to the processors 604 via the bus 610. The memory 606, the static memory 618, and/or the storage unit 620 may store the instructions 602 executable for performing any one or more of the methodologies or functions described herein. The instructions 602 may also or instead reside completely or partially within the main memory 616, within the static memory 618, within machine-readable medium 622 within the storage unit 620, within at least one of the processors 604 (e.g., within a cache memory of a given one of the processors 604), and/or any suitable combination thereof, during execution thereof by the computer system 600. In at least one embodiment, the machine-readable medium 622 includes one or more non-transitory computer-readable storage media.

Furthermore, also as depicted in FIG. 6, I/O components 608 may include a wide variety of components to receive input, produce and/or provide output, transmit information, exchange information, capture measurements, and/or the like. The specific I/O components 608 that are included in a particular instance of the computer system 600 will depend on the type of machine. For example, portable machines such as mobile phones may include a touch input device or other such input mechanisms, while a headless server machine may not include such a touch input device. Moreover, the I/O components 608 may include many other components that are not shown in FIG. 6.

In various example embodiments, the I/O components 608 may include input components 632 and output components 634. The input components 632 may include alphanumeric input components (e.g., a keyboard, a touchscreen configured to receive alphanumeric input, a photo-optical keyboard, and/or other alphanumeric input components), pointing-based input components (e.g., a mouse, a touchpad, a trackball, a joystick, a motion sensor, and/or one or more other pointing-based input components), tactile input components (e.g., a physical button, a touchscreen that is responsive to location and/or force of touches or touch gestures, and/or one or more other tactile input components), audio input components (e.g., a microphone), and/or the like. The output components 634 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth.

In further example embodiments, the I/O components 608 may include, as examples, biometric components 636, motion components 638, environmental components 640, and/or position components 642, among a wide array of possible components. As examples, the biometric components 636 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification and/or the like), etc. The motion components 638 may include acceleration-sensing components (e.g., an accelerometer), gravitation-sensing components, rotation-sensing components (e.g., a gyroscope), and/or the like.

The environmental components 640 may include, as examples, illumination-sensing components (e.g., a photometer), temperature-sensing components (e.g., one or more thermometers), humidity-sensing components, pressure-sensing components (e.g., a barometer), acoustic-sensing components (e.g., one or more microphones), proximity-sensing components (e.g., infrared sensors, millimeter-(mm)-wave radar) to detect nearby objects), gas-sensing components (e.g., gas-detection sensors to detect concentrations of hazardous gases for safety and/or to measure pollutants in the atmosphere), and/or other components that may provide indications, measurements, signals, and/or the like that correspond to a surrounding physical environment. The position components 642 may include location-sensing components (e.g., a Global Navigation Satellite System (GNSS) receiver such as a Global Positioning System (GPS) receiver), altitude-sensing components (e.g., altimeters and/or barometers that detect air pressure from which altitude may be derived), orientation-sensing components (e.g., magnetometers), and/or the like.

Communication may be implemented using a wide variety of technologies. The I/O components 608 may further include communication components 644 operable to communicatively couple the computer system 600 to one or more networks 624 and/or one or more devices 626 via a coupling 628 and/or a coupling 630, respectively. For example, the communication components 644 may include a network-interface component or another suitable device to interface with a given network 624. In further examples, the communication components 644 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 626 may include one or more other machines and/or any of a wide variety of peripheral devices (e.g., a peripheral device coupled via a universal serial bus (USB) connection).

Moreover, the communication components 644 may detect identifiers or include components operable to detect identifiers. For example, the communication components 644 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 644, such as location via IP geolocation, location via Wi-Fi signal triangulation, location via detecting an NFC beacon signal that may indicate a particular location, and/or the like.

One or more of the various memories (e.g., the memory 606, the main memory 616, the static memory 618, and/or the (e.g., cache) memory of one or more of the processors 604) and/or the storage unit 620 may store one or more sets of instructions (e.g., software) and/or data structures embodying or used by any one or more of the methodologies or functions described herein. These instructions (e.g., the instructions 602), when executed by one or more of the processors 604, cause performance of various operations to implement various embodiments of the present disclosure.

The instructions 602 may be transmitted or received over one or more networks 624 using a transmission medium, via a network-interface device (e.g., a network-interface component included in the communication components 644), and using any one of a number of transfer protocols (e.g., the Session Initiation Protocol (SIP), the HyperText Transfer Protocol (HTTP), and/or the like). Similarly, the instructions 602 may be transmitted or received using a transmission medium via the coupling 630 (e.g., a peer-to-peer coupling) to one or more devices 626. In some embodiments, IoT devices can communicate using Message Queuing Telemetry Transport (MQTT) messaging, which can be relatively more compact and efficient.

Figure 7:
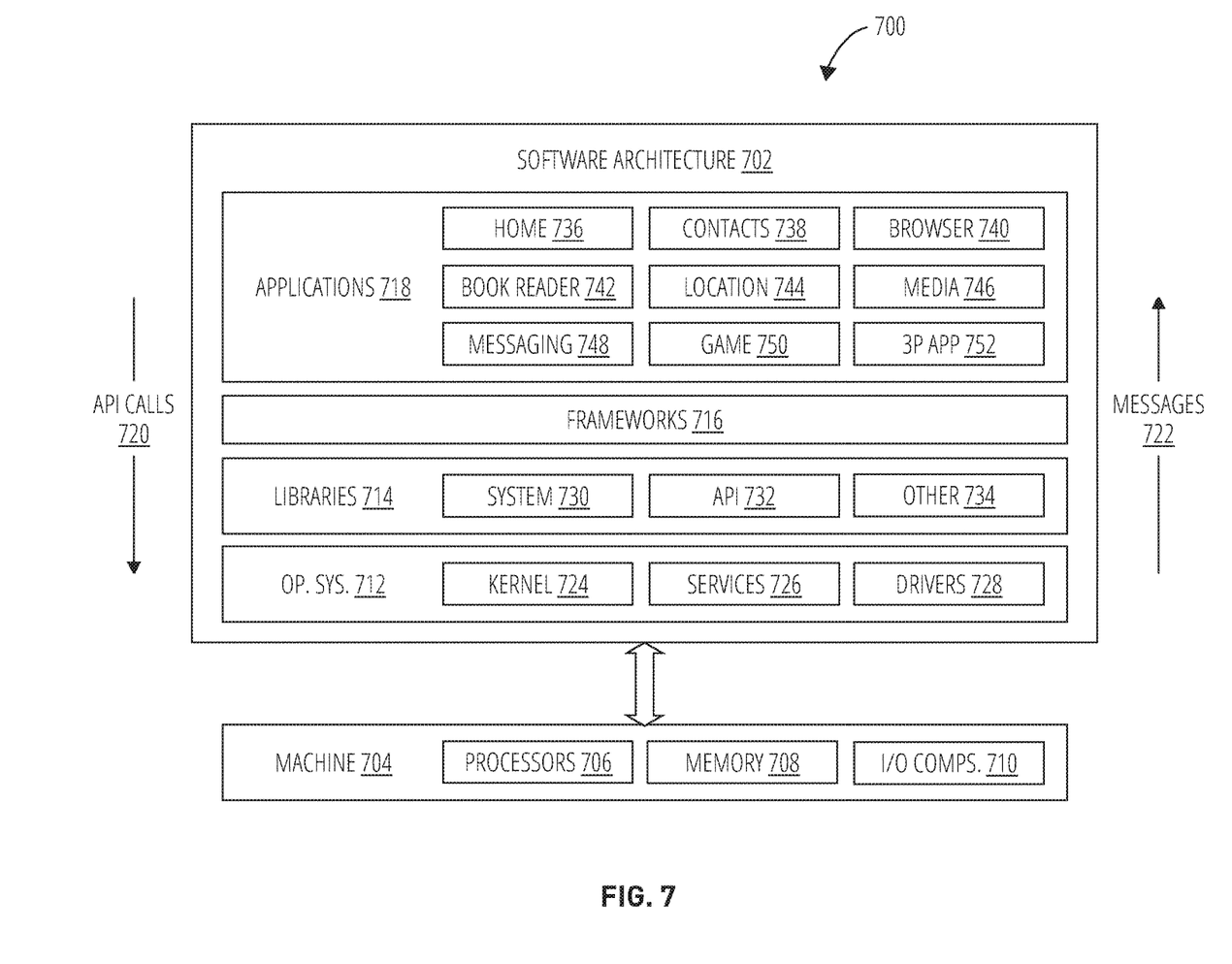
FIG. 7 depicts an example software architecture that could be executed on the example computer system of FIG. 6, in accordance with at least one embodiment.

FIG. 7 is a diagram 700 illustrating an example software architecture 702, which can be installed on any one or more of the devices described herein. For example, the software architecture 702 could be installed on any device or system that is arranged similar to the computer system 600 of FIG. 6. The software architecture 702 may be supported by hardware such as a machine 704 that may include processors 706, memory 708, and I/O components 710. In this example, the software architecture 702 can be conceptualized as a stack of layers, where each layer provides a particular functionality. The software architecture 702 may include layers such an operating system 712, libraries 714, frameworks 716, and applications 718. Operationally, using one or more application programming interfaces (APIs), the applications 718 may invoke API calls 720 through the software stack and receive messages 722 in response to the API calls 720.

In at least one embodiment, the operating system 712 manages hardware resources and provides common services. The operating system 712 may include, as examples, a kernel 724, services 726, and drivers 728. The kernel 724 may act as an abstraction layer between the hardware and the other software layers. For example, the kernel 724 may provide memory management, processor management (e.g., scheduling), component management, networking, and/or security settings, in some cases among one or more other functionalities. The services 726 may provide other common services for the other software layers. The drivers 728 may be responsible for controlling or interfacing with underlying hardware. For instance, the drivers 728 may include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 714 may provide a low-level common infrastructure used by the applications 718. The libraries 714 may include system libraries 730 (e.g., a C standard library) that may provide functions such as memory-allocation functions, string-manipulation functions, mathematic functions, and/or the like. In addition, the libraries 714 may include API libraries 732 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in graphic content on a display), database libraries (e.g., SQLite to provide various relational-database functions), web libraries (e.g., WebKit to provide web-browsing functionality), and/or the like. The libraries 714 may also include a wide variety of other libraries 734 to provide many other APIs to the applications 718.

The frameworks 716 may provide a high-level common infrastructure that may be used by the applications 718. For example, the frameworks 716 may provide various graphical-user-interface (GUI) functions, high-level resource management, high-level location services, and/or the like. The frameworks 716 may provide a broad spectrum of other APIs that may be used by the applications 718, some of which may be specific to a particular operating system or platform.

Purely as representative examples, the applications 718 may include a home application 736, a contacts application 738, a browser application 740, a book-reader application 742, a location application 744, a media application 746, a messaging application 748, a game application 750, and/or a broad assortment of other applications generically represented in FIG. 7 as a third-party application 752. The applications 718 may be programs that execute functions defined in the programs. Various programming languages may be employed to create one or more of the applications 718, structured in a variety of manners, such as object-oriented programming languages (e.g., Objective-C, Java, C++, etc.), procedural programming languages (e.g., C, assembly language, etc.), and/or the like. In a specific example, the third-party application 752 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. Moreover, a third-party application 752 may be able to invoke the API calls 720 provided by the operating system 712 to facilitate functionality described herein.

In view of the disclosure above, a listing of various examples of embodiments is set forth below. It should be noted that one or more features of an example, taken in isolation or combination, should be considered to be within the disclosure of this application.

Example 1 is a process-profiling system including at least one hardware processor; and at least one memory storing instructions that, when executed by the at least one hardware processor, cause the process-profiling system to: obtain sensor data captured by a plurality of sensors that are arranged to observe one or more human subjects performing one or more processes to accomplish one or more tasks; cluster the sensor data based on a set of one or more process-performance criteria; perform, based on the clustered sensor data, one or both of generating and updating one or more process profiles in a plurality of process profiles; select, for one or more corresponding automated machines, one or more process profiles from among the plurality of process profiles; and configure the one or more corresponding automated machines to operate according to the selected one or more process profiles.

Example 2 is the process-profiling system of Example 1, where the plurality of sensors includes one or more of a video sensor, an audio sensor, a wireless-communication sensor, and a sensor associated with a wearable device.

Example 3 is the process-profiling system of any of the Examples 1-2, where the instructions to cluster the sensor data based on the set of one or more process-performance criteria include instructions to cluster human-subject-based sets of sensor data, each human-subject-based set of sensor data corresponding to a human subject of the one or more human subjects.

Example 4 is the process-profiling system of Example 3, where the instructions to cluster the human-subject-based sets of sensor data include instructions to perform multiple different clusterings of the human-subject-based sets of sensor data, each of the multiple different clusterings using different sets of the process-performance criteria.

Example 5 is the process-profiling system of any of the Examples 1-4, where at least one of the one or more processes includes at least one sub-process.

Example 6 is the process-profiling system of any of the Examples 1-5, where the process-performance criteria includes at least one quality metric associated with performance of at least one of the one or more processes.

Example 7 is the process-profiling system of any of the Examples 1-6, where the process-performance criteria includes at least one time-based metric associated with performance of at least one of the one or more processes.

Example 8 is the process-profiling system of any of the Examples 1-7, where the instructions to select, for the one or more corresponding automated machines, one or more process profiles from among the plurality of process profiles include instructions to: select a first process profile for a first one of the automated machines; and select a second, different process profile for a second one of the automated machines.

Example 9 is the process-profiling system of any of the Examples 1-8, where the instructions to configure the one or more corresponding automated machines to operate according to the selected one or more process profiles include instructions to transmit instructions to the corresponding automated machines.

Example 10 is at least one non-transitory computer-readable storage medium containing instructions that, when executed by at least one hardware processor of a computer system, cause the computer system to: obtain sensor data captured by a plurality of sensors that are arranged to observe one or more human subjects performing one or more processes to accomplish one or more tasks; cluster the sensor data based on a set of one or more process-performance criteria; perform, based on the clustered sensor data, one or both of generating and updating one or more process profiles in a plurality of process profiles; select, for one or more corresponding automated machines, one or more process profiles from among the plurality of process profiles; and configure the one or more corresponding automated machines to operate according to the selected one or more process profiles.

Example 11 is the at least one non-transitory computer-readable storage medium of Example 10, where the plurality of sensors includes one or more of a video sensor, an audio sensor, a wireless-communication sensor, and a sensor associated with a wearable device.

Example 12 is the at least one non-transitory computer-readable storage medium of any of the Examples 10-11, where the instructions to cluster the sensor data based on the set of one or more process-performance criteria include instructions to cluster human-subject-based sets of sensor data, each human-subject-based set of sensor data corresponding to a human subject of the one or more human subjects.

Example 13 is the at least one non-transitory computer-readable storage medium of Example 12, where the instructions to cluster the human-subject-based sets of sensor data include instructions to perform multiple different clusterings of the human-subject-based sets of sensor data, each of the multiple different clusterings using different sets of the process-performance criteria.

Example 14 is at least one non-transitory computer-readable storage medium of any of the Examples 10-13, where at least one of the one or more processes includes at least one sub-process.

Example 15 is at least one non-transitory computer-readable storage medium of any of the Examples 10-14, where the process-performance criteria includes at least one quality metric associated with performance of at least one of the one or more processes.

Example 16 is at least one non-transitory computer-readable storage medium of any of the Examples 10-15, where the process-performance criteria includes at least one time-based metric associated with performance of at least one of the one or more processes.

Example 17 is at least one non-transitory computer-readable storage medium of any of the Examples 10-16, where the instructions to select, for the one or more corresponding automated machines, one or more process profiles from among the plurality of process profiles include instructions to: select a first process profile for a first one of the automated machines; and select a second, different process profile for a second one of the automated machines.

Example 18 is at least one non-transitory computer-readable storage medium of any of the Examples 10-17, where the instructions to configure the one or more corresponding automated machines to operate according to the selected one or more process profiles include instructions to transmit instructions to the corresponding automated machines.

Example 19 is a method performed by a process-profiling system by executing instructions on at least one hardware processor, the method including: obtaining sensor data captured by a plurality of sensors that are arranged to observe one or more human subjects performing one or more processes to accomplish one or more tasks; clustering the sensor data based on a set of one or more process-performance criteria; performing, based on the clustered sensor data, one or both of generating and updating one or more process profiles in a plurality of process profiles; selecting, for one or more corresponding automated machines, one or more process profiles from among the plurality of process profiles; and configuring the one or more corresponding automated machines to operate according to the selected one or more process profiles.

Example 20 is the method of Example 19, where the plurality of sensors includes one or more of a video sensor, an audio sensor, a wireless-communication sensor, and a sensor associated with a wearable device.

Example 21 is the method of any of the Examples 19-20, where the instructions to cluster the sensor data based on the set of one or more process-performance criteria include instructions to cluster human-subject-based sets of sensor data, each human-subject-based set of sensor data corresponding to a human subject of the one or more human subjects.

Example 22 is the method of any of the Examples 19-21, where at least one of the one or more processes includes at least one sub-process.

Example 23 is the method of any of the Examples 19-22, where the process-performance criteria includes at least one quality metric associated with performance of at least one of the one or more processes.

Example 24 is the method of any of the Examples 19-23, where the process-performance criteria includes at least one time-based metric associated with performance of at least one of the one or more processes.

Example 25 is the method of any of the Examples 19-24, where selecting, for the one or more corresponding automated machines, one or more process profiles from among the plurality of process profiles includes: selecting a first process profile for a first one of the automated machines; and selecting a second, different process profile for a second one of the automated machines.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

As used in this disclosure, including in the claims, phrases of the form "at least one of A and B," "at least one of A, B, and C," and the like should be interpreted as if the language "A and/or B," "A, B, and/or C," and the like had been used in place of the entire phrase. Unless explicitly stated otherwise in connection with a particular instance, this manner of phrasing is not limited in this disclosure to meaning only "at least one of A and at least one of B," "at least one of A, at least one of B, and at least one of C," and so on. Rather, as used herein, the two-element version covers each of the following: one or more of A and no B, one or more of B and no A, and one or more of A and one or more of B. And similarly for the three-element version and beyond. Similar construction should be given to such phrases in which "one or both," "one or more," and the like is used in place of "at least one," again unless explicitly stated otherwise in connection with a particular instance.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

Furthermore, in this disclosure, in one or more embodiments, examples, and/or the like, it may be the case that one or more components of one or more devices, systems, and/or the like are referred to as modules that carry out (e.g., perform, execute, and the like) various functions. With respect to any such usages in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation.

In at least one embodiment, the instructions for a given module are executable by the hardware for carrying out the one or more herein-described functions of the module, and could include hardware (e.g., hardwired) instructions, firmware instructions, software instructions, and/or the like, stored in any one or more non-transitory computer-readable storage media deemed suitable by those of skill in the art for a given implementation. Each such non-transitory computer-readable storage medium could be or include memory (e.g., random access memory (RAM), read-only memory (ROM), erasable programmable read-only memory (EPROM), electrically erasable programmable read-only memory (EEPROM a.k.a. E2PROM), flash memory, and/or one or more other types of memory) and/or one or more other types of non-transitory computer-readable storage medium. A module could be realized as a single component or be distributed across multiple components.

What is claimed is:

1. A process-profiling system comprising:
   at least one hardware processor; and
   at least one memory storing instructions that, when executed by the at least one hardware processor, cause the process-profiling system to:
   obtain human-subject-based sets of sensor data captured by a plurality of sensors that are arranged to observe one or more human subjects performing one or more processes to accomplish one or more tasks;
   cluster the human-subject-based sets of sensor data based on a set of one or more process-performance criteria to generate a plurality of clusters, wherein the set of one or more process-performance criteria includes (i) at least one time-based metric to reach completion of the one or more processes and (ii) at least one quality metric of the completion of the one or more processes, for a respective series of actions performed by the one or more human subjects, and wherein each cluster of the plurality of clusters corresponds to a different balance point between a time-based metric and a quality metric for the one or more human subjects to perform the one or more processes with tradeoffs between the quality metric and the time-based metric;
   perform, based on the plurality of clusters, one or both of generating and updating one or more process profiles in a plurality of process profiles, each process profile of the plurality of process profiles corresponding to a different way of performing a certain process;
   select, for one or more corresponding automated machines, at least one process profile from the plurality of process profiles; and
   configure the one or more corresponding automated machines to operate according to the selected at least one process profile.

2. The process-profiling system of claim 1, wherein the plurality of sensors includes one or more of a video sensor, an audio sensor, a wireless-communication sensor, and a sensor associated with a wearable device.

3. The process-profiling system of claim 1, wherein each human-subject-based set of sensor data corresponds to a human subject of the one or more human subjects.

4. The process-profiling system of claim 3, wherein the instructions to cluster the human-subject-based sets of sensor data comprise instructions to perform multiple different clusterings of the human-subject-based sets of sensor data, each of the multiple different clusterings using different sets of one or more process-performance criteria.

5. The process-profiling system of claim 1, wherein at least one of the one or more processes comprises at least one sub-process.

6. The process-profiling system of claim 1, wherein the instructions to select, for the one or more corresponding automated machines, the at least one process profile from the plurality of process profiles comprise instructions to:
   select a first process profile for a first automated machine of the one or more corresponding automated machines; and
   select a second process profile, different from the first process profile, for a second automated machine of the one or more corresponding automated machines.

7. The process-profiling system of claim 1, wherein the instructions to configure the one or more corresponding automated machines to operate according to the selected at least one process profile comprise instructions to transmit instructions to the one or more corresponding automated machines.

8. The process-profiling system of claim 1, wherein the at least one time-based metric or the at least one quality metric are selected based on a type of application or a use case for the one or more corresponding automated machines.

9. At least one non-transitory computer-readable storage medium containing instructions that, when executed by at least one hardware processor of a computer system, cause the computer system to:
   obtain human-subject-based sets of sensor data captured by a plurality of sensors that are arranged to observe one or more human subjects performing one or more processes to accomplish one or more tasks;
   cluster the human-subject-based sets of sensor data based on a set of one or more process-performance criteria to generate a plurality of clusters, wherein the set of one or more process-performance criteria includes (i) at least one time-based metric to reach completion of the one or more processes and (ii) at least one quality metric of the completion of the one or more processes, for a respective series of actions performed by the one or more human subjects, and wherein each cluster of the plurality of clusters corresponds to a different balance point between a time-based metric and a quality metric for the one or more human subjects to perform the one or more processes with tradeoffs between the quality metric and the time-based metric;
   perform, based on the plurality of clusters, one or both of generating and updating one or more process profiles in a plurality of process profiles, each process profile of the plurality of process profiles corresponding to a different way of performing a certain process;
   select, for one or more corresponding automated machines, at least one process profile from the plurality of process profiles; and
   configure the one or more corresponding automated machines to operate according to the selected at least one process profile.

10. The at least one non-transitory computer-readable storage medium of claim 9, wherein the plurality of sensors includes one or more of a video sensor, an audio sensor, a wireless-communication sensor, and a sensor associated with a wearable device.

11. The at least one non-transitory computer-readable storage medium of claim 9, wherein each human-subject-based set of sensor data corresponds to a human subject of the one or more human subjects.

12. The at least one non-transitory computer-readable storage medium of claim 11, wherein the instructions to cluster the human-subject-based sets of sensor data comprise instructions to perform multiple different clusterings of the human-subject-based sets of sensor data, each of the multiple different clusterings using different sets of one or more process-performance criteria.

13. The at least one non-transitory computer-readable storage medium of claim 9, wherein at least one of the one or more processes comprises at least one sub-process.

14. The at least one non-transitory computer-readable storage medium of claim 9, wherein the instructions to select, for the one or more corresponding automated machines, the at least one process profile from the plurality of process profiles comprise instructions to:
  select a first process profile for a first automated machine of the one or more corresponding automated machines; and
  select a second process profile, different from the first process profile, for a second automated machine of the one or more corresponding automated machines.

15. The at least one non-transitory computer-readable storage medium of claim 9, wherein the instructions to configure the one or more corresponding automated machines to operate according to the selected at least one process profile comprise instructions to transmit instructions to the one or more corresponding automated machines.

16. The at least one non-transitory computer-readable storage medium of claim 9, wherein the at least one time-based metric or the at least one quality metric are selected based on a type of application or a use case for the one or more corresponding automated machines.

17. A method performed by a process-profiling system by executing instructions on at least one hardware processor, the method comprising:
  obtaining human-subject-based sets of sensor data captured by a plurality of sensors that are arranged to observe one or more human subjects performing one or more processes to accomplish one or more tasks;
  clustering the human-subject-based sets of sensor data based on a set of one or more process-performance criteria to generate a plurality of clusters, wherein the set of one or more process-performance criteria includes (i) at least one time-based metric to reach completion of the one or more processes and (ii) at least one quality metric of the completion of the one or more processes, for a respective series of actions performed by the one or more human subjects, and wherein each cluster of the plurality of clusters corresponds to a different balance point between a time-based metric and a quality metric for the one or more human subjects to perform the one or more processes with tradeoffs between the quality metric and the time-based metric;
  performing, based on the plurality of clusters, one or both of generating and updating one or more process profiles in a plurality of process profiles, each process profile of the plurality of process profiles corresponding to a different way of performing a certain process;
  selecting, for one or more corresponding automated machines, at least one process profile from the plurality of process profiles; and
  configuring the one or more corresponding automated machines to operate according to the selected at least one process profile.

18. The method of claim 17, wherein the plurality of sensors includes one or more of a video sensor, an audio sensor, a wireless-communication sensor, and a sensor associated with a wearable device.

19. The method of claim 17, wherein each human-subject-based set of sensor data corresponds to a human subject of the one or more human subjects.

20. The method of claim 19, wherein clustering the human-subject-based sets of sensor data includes performing multiple different clusterings of the human-subject-based sets of sensor data, each of the multiple different clusterings using different sets of one or more process-performance criteria.

21. The method of claim 17, wherein at least one of the one or more processes comprises at least one sub-process.

22. The method of claim 17, wherein selecting, for the one or more corresponding automated machines, the at least one process profile from the plurality of process profiles comprises:
  selecting a first process profile for a first automated machine of the one or more corresponding automated machines; and
  selecting a second process profile, different from the first process profile, for a second automated machine of the one or more corresponding automated machines.

23. The method of claim 17, wherein configuring the one or more corresponding automated machines to operate according to the selected at least one process profile includes transmitting instructions to the one or more corresponding automated machines.

24. The method of claim 17, wherein the at least one time-based metric or the at least one quality metric are selected based on a type of application or a use case for the one or more corresponding automated machines.

* * * * *